United States Patent Office 3,115,238
Patented Dec. 24, 1963

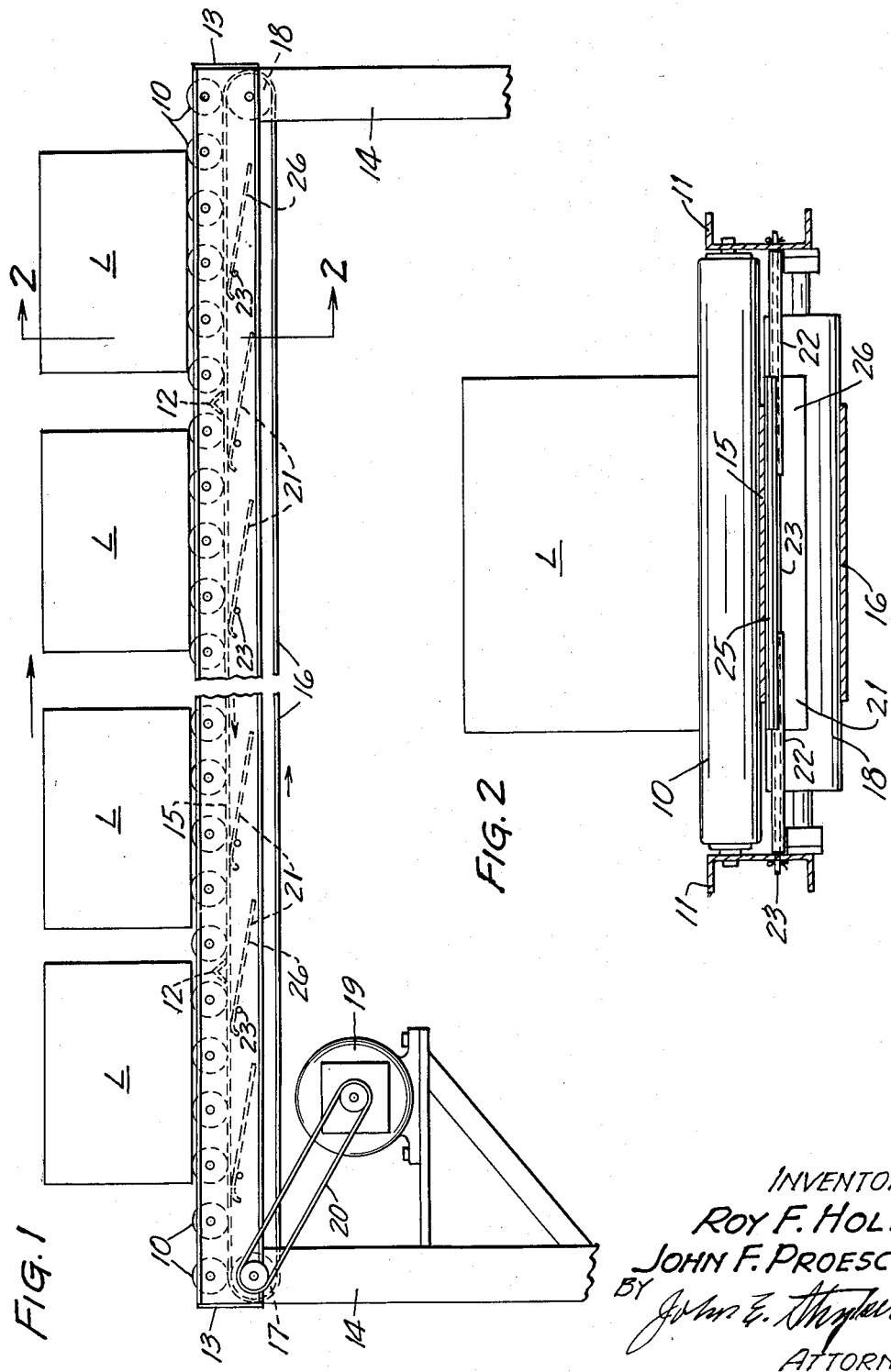

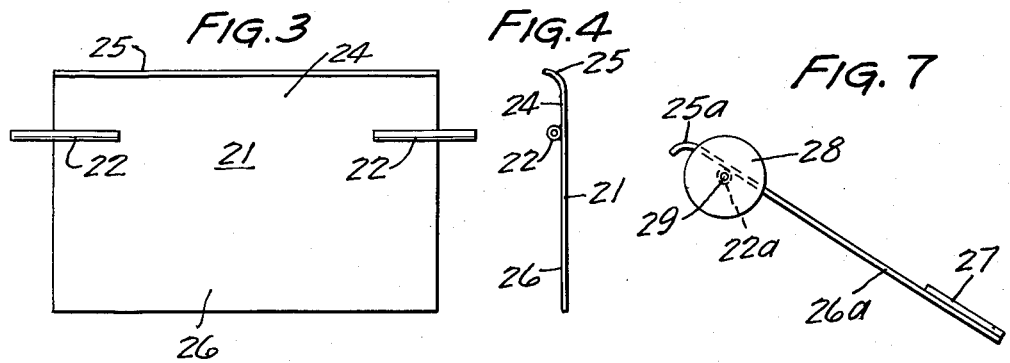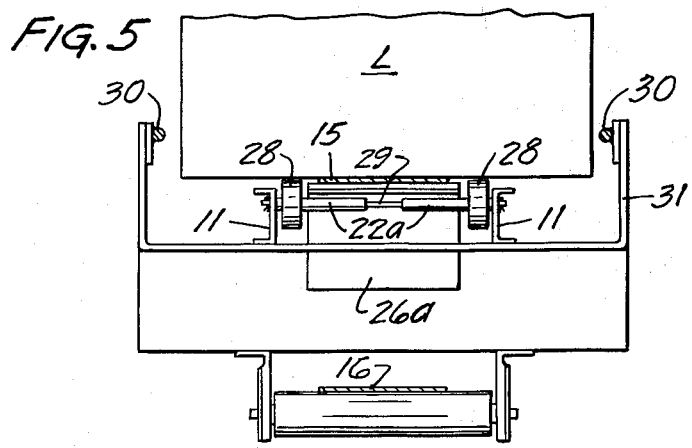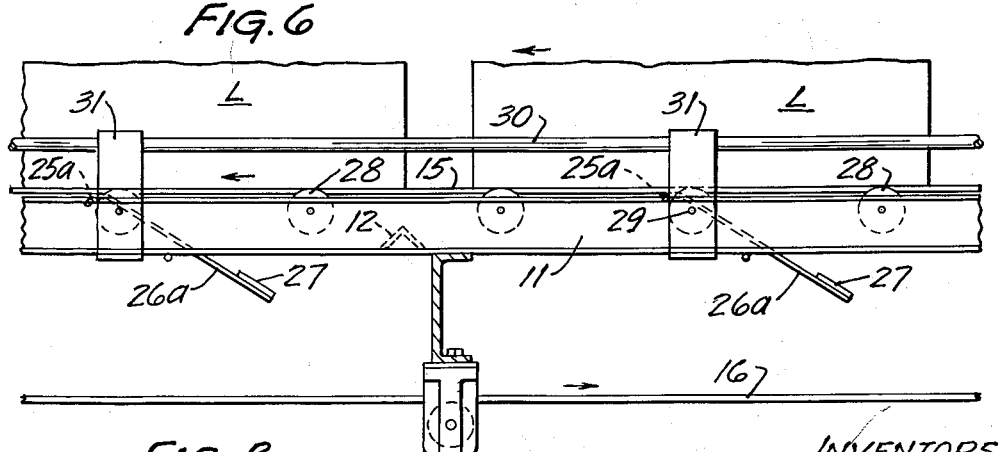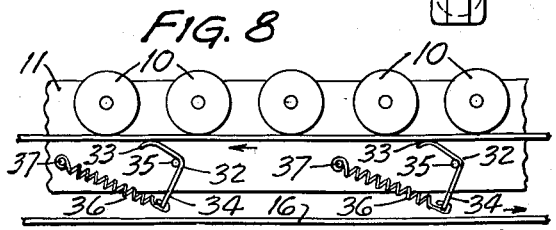

3,115,238
CONVEYOR BELT ACTUATORS
Roy F. Holm, St. Paul, and John F. Proesch, Stillwater, Minn., assignors to Standard Conveyor Company, North St. Paul, Minn., a corporation of Minnesota
Filed Feb. 6, 1961, Ser. No. 87,468
6 Claims. (Cl. 198—127)

This invention relates to improvements in conveyor belt actuators for conveyors of the type having a power-driven belt for moving articles of various types, hereinafter called "load units," along a determined path which is usually straight and either horizontal or inclined.

It is an object of our invention to provide novel and simplified means for biasing the driving reach of a conveyor belt to frictionally engage either the peripheries of load supporting rollers or to frictionally engage load units carried by the conveyor.

A particular object is to provide a conveyor of the class described with a series of belt actuators disposed to frictionally engage the bottom surface of the belt and to bias it toward driving position whereby a minimum pressure between the load units and driving means may be maintained to move the load units along the conveyor when they are free to move, and at the same time to minimize loss of power and wear when an accumulation of load units on the conveyor is caused by stoppage of their forward travel on the conveyor.

Our invention also includes certain other novel features of construction whereby a predetermined frictional pressure is exerted by the belt and maintained consistently with the work to be performed, and is so applied as to compensate for eccentricities of the load supporting rollers.

Other objects will appear and be more fully pointed out in the following specification and claims.

Referring to the accompanying drawings:

FIGURE 1 is a side elevational view of a conveyor provided with a series of our belt actuators of a preferred form;

FIG. 2 is a cross sectional view taken on the line 2—2 of FIG. 1;

FIG. 3 is a side elevational view showing details of one of the belt actuators;

FIG. 4 is an end view of the same;

FIG. 5 is a cross sectional view showing an alternate form of conveyor having actuators arranged to frictionally engage the bottom surfaces of load units carried by the conveyor;

FIG. 6 is a fragmentary side elevational view showing an alternate form of the invention like that shown in FIG. 5;

FIG. 7 is an end view showing details of an actuator and its pivotal support of the form shown in FIGS. 5 and 6, and FIG. 8 is a fragmentary side elevational view showing a modified form of actuator having a spring for biasing the actuator lever arm and driving reach of the belt toward the conveyor plane.

As shown in FIGS. 1 and 2, the conveyor is of the common type having anti-friction load supporting rollers 10 suitably mounted between parallel side rails 11, the latter being rigidly connected together at suitable intervals by cross frame members 12 and also being connected by end plates 13. This conveyor is supported at a suitable elevation on legs 14 and includes an endless, power driven, flexible belt having a driving reach 15 and a return reach 16 trained on belt supporting rollers 17 and 18 mounted between opposite end portions respectively of the rails 11. The belt is operatively connected to an electric motor 19 by suitable power transmission means. As shown, the driving means comprises a chain or belt 20, suitable pulleys or sprocket wheels, and a speed reduction connection between the shaft of motor 19 and one of the driven wheels. The driving reach 15 of the conveyor belt is arranged to frictionally engage the lower peripheries of the load supporting rollers 10. Conveyors of this general type are well known and in wide use. It will be evident that the upper peripheries of the load supporting rollers 10 define a load conveying plane along which load units L are moved by the rollers 10.

A preferred form of our improved belt actuator is shown in FIGS. 1–4 inclusive. As shown, there are a series of regularly spaced actuator plates 21 mounted adjacent to the lower side of the belt reach 15. Each actuator comprises a generally rectangular plate 21 having rigidly secured thereto, as by welding, fulcrum members 22 of tubular form adapted to receive a fulcrum rod 23 extending crosswise of the belt and having ends suitably secured to the side rails 11, as best shown in FIG. 2. The ends of each rod 23 are connected respectively to opposite side rails 11, and the tubular fulcrum members 22 project laterally from each actuator to engage the inner surfaces of the rails and center the actuator in relation to the side rails and belt reach 15.

A relatively short lever arm portion 24 of each plate 21 is formed with a laterally bent edge portion 25, the convex side of which slidably engages the bottom surface of the belt reach 15. Projecting from the opposite side of the pivot axis defined by the fulcrum rod 23 is a relatively long lever arm portion 26 of the plate 21 which has sufficient weight to bias the edge portion 25 upwardly, and to apply sufficient pressure to the belt reach 15 to bias it toward the conveyor plane defined by the rollers 10. The edge portions 25 thus engage and raise the belt along lines located midway between adjacent load supporting rollers 10. The force thus applied is predetermined so that it is just sufficient to apply through the rollers the traction necessary to move the load units along the conveyor. The spacing of the belt actuators along the conveyor and pressure applied by each of them may be varied to provide no more than the required driving force.

By constructing the plates 21 from metal of suitable gauge, e.g., 12-gauge mild steel, and by suitable location of the fulcrum axis defined by the tubular members 22, the lever arm member 26 may be given sufficient weight to operate the actuators by gravity. It will be evident that the pressure applied by each actuator may be increased by increasing the length and weight of the arm member 26 and/or by attaching thereto a counterweight 27, as indicated in FIGS. 6 and 7.

FIGS. 5 and 6 illustrate an application of our invention to a conveyor of the type wherein the conveying surface is defined by a multiplicity of anti-friction rollers 28, and the conveyor belt has its upper reach 15 disposed substantially in the conveyor plane for frictional engagement with the bottom surfaces of the load units L. For this type of conveyor the fulcrum for each belt actuator plate 26a may comprise a rod 29 coaxially disposed in relation to a pair of load supporting rollers 28. An edge portion 25a of each plate 26a slidably engages the bottom surface of the belt reach 15 to bias it to an elevated position in which the belt frictionally engages the load units L. Tubular fulcrum members 22a are rigidly secured to each plate 26a and project at the sides thereof to retain the plate in properly centered relation to the belt reach 15 and side rails of the conveyor. The belt is thus supported and biased upwardly by a series of actuator plates, which are slightly wider than the belt. In other respects the conveyor shown in FIGS. 5 and 6 is of the conventional type having side rails 11 rigidly connected together by cross frame members. Guide rods 30 extend along opposite sides of the conveyor to retain the load units on the conveyor, the guide rods being supported at suitable intervals on brackets 31.

FIG. 8 shows, somewhat schematically, a modification of our actuators for a conveyor of the general type shown in FIGS. 1 and 2. A series of actuators, indicated generally by the numeral 32, are spaced along the lower side of the reach 15 of the conveyor belt. Each of the actuators 32 has a belt engaging lever arm member 33, a second lever arm member 34 and a fulcrum support 35. The fulcrum support 35 may comprise a tubular member fixed on the plate 32 and pivotally connected at its ends to the side rails 11 of the conveyor. A coiled spring 36 is connected to the lever arm 34 at one end and at its other end is anchored on a cross rod 37 so that this spring biases the lever arm 33 in a generally upward direction so that the reach 15 of the belt is pressed upwardly in frictional engagement with the lower peripheries of the load supporting rollers 10. The lever arm 33 of the plate 32 is preferably somewhat wider than the belt reach 15 so that the belt has a continuous, laterally extending support on the arm member 33.

Each lever arm member 24, 25 and 33 is thereby caused to support and bias the belt toward the conveyor plane. We prefer to position the belt engaging arm members of the several actuators at the leading side of the plates in the direction of movement of the belt reach 15, as indicated by arrows in FIGS. 1, 6 and 8. However, for some installations it may be feasible to reverse the direction of movement of the belt in relation to the actuators.

Our improved belt actuators are particularly advantageous for use where the load units carried by the conveyor are to be stopped on the conveyor while the driving belt is in continuous operation. It is common practice to support the driving reach of belt conveyors on rollers which are mounted at a fixed elevation so that such rollers retain the belt in driving contact with load supporting rollers. In other types of prior conveyors the belt supporting rollers are adjustable to and from the belt to vary the pressure of the belt on the load units or on load supporting rollers. It has been found, however, that such belt supporting rollers are not entirely satisfactory for a number of reasons. When the conveyor line is blocked for accumulation purposes or for other reason, the pressure exerted by the belt supporting rollers is usually excessive, resulting in a considerable loss of power during periods of stoppage. Such excessive pressure also causes unnecessary wear on the belt and on either the load supporting rollers when they are used or on the bottom surfaces of the load units when the belt is in direct contact with the load units. Vertical adjustment of such rollers with the precision required to produce the exact driving force needed in each conveyor presents a difficult problem. Heretofore, to insure sufficient driving force, it has been considered necessary to so adjust the belt pressure rollers as to afford more than 10% in excess of the driving force required. This driving force is sometimes as high as 100% in excess of the required force and is, of course, added to the work that normally would be required to move the free load units on the conveyor. When a number of heavy load units are stopped in contact one with another on a conventional live roller conveyor the end to end pressure between units is sometimes so excessive as to damage the units or make it difficult to separate them on the conveyor line.

Another difficulty encountered with conveyors having wide belts supported on rollers is the tendency of the supporting rollers to bias the belt laterally out of its proper tracking alignment with the drums on which the belt is trained. Conventional belt supporting rollers also fail to compensate for eccentricities of the several load supporting rollers.

These difficulties are largely overcome by the present invention which makes it feasible to exert approximately the minimum pressure between the belt and load units or their supporting and driving members as required to move the load units when they are free to travel. This pressure is that which would occur when the conveyor line is blocked. In each of the several forms of our actuators the fulcrum for the belt engaging lever member is so located as to allow movement of this contact member to compensate for the eccentricities of load supporting rollers and to provide uniform pressure of the belt against such rollers or against the load units. There is thus a uniform transmission of power to the rollers or to the load units on the conveyor. It has been found that these actuators may be so adjusted as to produce a hold-back pressure on the load units on the order of 3½% of the weight of the load units. The cost of our belt actuators is also considerably lower than that of ordinary roller type belt actuators.

We claim:

1. A conveyor of the type having a frame, anti-friction load supporting means carried by said frame, defining a load conveying plane, and a power-driven wide and relatively thin flexible belt disposed with a driving reach extending lengthwise of said plane; the improvements which comprise, a series of belt actuators spaced along the lower side of said reach of said belt for biasing it toward said plane, each of said actuators comprising a rigid, wide and relatively thin plate, fulcrum means pivotally connecting said plate to said frame, the pivot axis of said fulcrum means extending crosswise of said belt, said plate having a belt engaging lever arm portion projecting obliquely upwardly from said pivot axis and formed with a margin portion having an upwardly facing convex surface of sufficient width to underlie and engage said belt reach across substantially the entire width thereof, said convex surface being disposed in fixed relation at the other end of said lever arm portion against rotation with respect to said lever arm portion and contacting said belt in sliding non-rotary engagement along the under side of said belt reach, and a second lever arm portion of said plate projecting from said fulcrum means and biasing said belt engaging portion of the plate and belt upwardly toward said load conveying plane.

2. A conveyor in accordance with claim 1 in which said driving reach of the belt is disposed to frictionally engage the lower peripheries of said anti-friction load supporting means.

3. A conveyor in accordance with claim 1 in which said driving reach of the belt is disposed to frictionally engage the bottom surfaces of the load units carried on the conveyor.

4. A conveyor in accordance with claim 1 in which said anti-friction load supporting means comprises a multiplicity of spaced parallel rollers and said power-driven flexible belt is disposed to frictionally engage the lower peripheries of said rollers.

5. A conveyor in accordance with claim 1 including spring means operatively connected to said second lever arm portion of said plate for biasing the belt engaging portion of the plate upwardly.

6. A conveyor in accordance with claim 1 in which said second lever arm portion of said plate projects obliquely downwardly and rearwardly from said belt-engaging lever arm portion and has sufficient weight to bias said belt-engaging lever arm portion of the plate and belt upwardly toward said load conveying plane.

References Cited in the file of this patent

UNITED STATES PATENTS

| | | |
|---|---|---|
| 1,598,099 | Murray | Aug. 31, 1926 |
| 1,856,733 | Shepherd | May 3, 1932 |
| 1,903,732 | Walter | Apr. 11, 1933 |
| 2,493,479 | Eggleston | Jan. 3, 1950 |
| 2,895,593 | McKnight | July 21, 1959 |
| 2,965,374 | Streeter | Dec. 20, 1960 |
| 3,012,652 | Poel | Dec. 12, 1961 |

UNITED STATES PATENT OFFICE
CERTIFICATE OF CORRECTION

Patent No. 3,115,238                          December 24, 1963

Roy F. Holm et al.

It is hereby certified that error appears in the above numbered patent requiring correction and that the said Letters Patent should read as corrected below.

Column 4, line 34, for "other" read -- outer --.

Signed and sealed this 26th day of May 1964.

(SEAL)
Attest:

ERNEST W. SWIDER                      EDWARD J. BRENNER

Attesting Officer                       Commissioner of Patents